(12) United States Patent
Lin et al.

(10) Patent No.: US 12,549,010 B2
(45) Date of Patent: Feb. 10, 2026

(54) ENERGY STORAGE SYSTEM CONTROL METHOD, CONTROL APPARATUS, AND ENERGY STORAGE SYSTEM

(71) Applicant: CONTEMPORARY AMPEREX TECHNOLOGY (HONG KONG) LIMITED, Hong Kong (CN)

(72) Inventors: Longzhen Lin, Ningde (CN); Yu Yan, Ningde (CN); Diping Liu, Ningde (CN); Shaoyan Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/030,371

(22) Filed: Jan. 17, 2025

(65) Prior Publication Data
US 2025/0167556 A1    May 22, 2025

Related U.S. Application Data

(63) Continuation of application No. PCT/CN2022/121686, filed on Sep. 27, 2022.

(51) Int. Cl.
*H02J 3/32* (2006.01)
*H02J 7/00* (2006.01)
*H02J 7/34* (2006.01)

(52) U.S. Cl.
CPC .............. *H02J 3/32* (2013.01); *H02J 7/0013* (2013.01); *H02J 7/0048* (2020.01);
(Continued)

(58) Field of Classification Search
CPC ..................................... H02J 3/322
See application file for complete search history.

(56) References Cited

U.S. PATENT DOCUMENTS

| | | | |
|---|---|---|---|
| 12,199,303 B2 * | 1/2025 | Wang | H02J 7/0029 |
| 2013/0249466 A1 | 9/2013 | Hsieh et al. | |

(Continued)

FOREIGN PATENT DOCUMENTS

| | | |
|---|---|---|
| CN | 101051701 A | 10/2007 |
| CN | 104393356 A | 3/2015 |

(Continued)

OTHER PUBLICATIONS

CN-111497670_Translation, Charging Device, System And Method, Ru, (Year: 2020).*

(Continued)

*Primary Examiner* — Tynese V Mcdaniel
(74) *Attorney, Agent, or Firm* — K&L Gates LLP

(57) ABSTRACT

This application provides an energy storage system control method, a control apparatus, and an energy storage system. The energy storage system is coupled to an energy generation system and includes a plurality of energy storage units. The energy storage system control method includes: controlling, in a first stage, the energy generation system to charge a first energy storage unit in the plurality of energy storage units, where the first stage is a charging stage in a charging cycle of the first energy storage unit; and controlling, in a second stage, the first energy storage unit to discharge electricity to a second energy storage unit in the plurality of energy storage units, where the second stage is a discharging stage in the charging cycle of the first energy storage unit.

16 Claims, 4 Drawing Sheets

(52) U.S. Cl.
CPC ............ *H02J 7/0063* (2013.01); *H02J 7/007* (2013.01); *H02J 7/342* (2020.01); *H02J 2207/20* (2020.01)

(56) References Cited

U.S. PATENT DOCUMENTS

| | | | | |
|---|---|---|---|---|
| 2014/0152100 | A1* | 6/2014 | Lim | H02J 7/0029 307/18 |
| 2014/0184136 | A1* | 7/2014 | Ture | H02J 7/00 320/101 |
| 2017/0070084 | A1* | 3/2017 | Matsumoto | H02J 3/32 |
| 2017/0237260 | A1* | 8/2017 | Rhie | H02J 3/00 307/72 |
| 2017/0310112 | A1* | 10/2017 | Goasguen | H02J 3/38 |
| 2019/0013673 | A1* | 1/2019 | Kim | H02J 7/0019 |
| 2019/0222028 | A1* | 7/2019 | Dibachi | H02J 7/35 |
| 2020/0021236 | A1* | 1/2020 | Pan | H02J 7/35 |
| 2020/0073342 | A1* | 3/2020 | Lee | G05B 17/02 |
| 2021/0111576 | A1* | 4/2021 | Tinio | G05B 13/026 |
| 2022/0360105 | A1* | 11/2022 | Beaston | H02J 7/0048 |
| 2025/0007299 | A1* | 1/2025 | Chen | H02J 7/007182 |

FOREIGN PATENT DOCUMENTS

| | | | | |
|---|---|---|---|---|
| CN | 111497670 | A * | 8/2020 | ............. B60L 53/63 |
| EP | 2503665 | A1 | 9/2012 | |
| JP | 2016184476 | A | 10/2016 | |
| JP | 2017175888 | A | 9/2017 | |

OTHER PUBLICATIONS

International Search Report for PCT Application PCT/CN2022/121686, mailed May 17, 2023, 5 pages.

Extended European Search Report, mailed Sep. 4, 2025, for corresponding European Patent Application Serial No. 22959819.8.

* cited by examiner

300

Control, in a first stage, an energy generation system to charge a first energy storage unit in a plurality of energy storage units — 310

Control, in a second stage, the first energy storage unit to discharge electricity to a second energy storage unit in the plurality of energy storage units — 320

─ 311

Control, in a first stage, based on at least one of dispatch status of a power grid, an output power of an energy generation system, a charge power of a first energy storage unit, a remaining capacity of the first energy storage unit, or a remaining capacity of a second energy storage unit, the energy generation system to charge the first energy storage unit in the plurality of energy storage units

─ 320

Control, in a second stage, the first energy storage unit to discharge electricity to a second energy storage unit in the plurality of energy storage units

Control, in a case that dispatch status of a power grid includes no requirement for energy dispatch, based on an output power of an energy generation system, a charge power of a first energy storage unit, and a remaining capacity of a second energy storage unit, the energy generation system to charge the first energy storage unit

─ 320

Control, in a second stage, the first energy storage unit to discharge electricity to a second energy storage unit in the plurality of energy storage units

FIG. 6

ENERGY STORAGE SYSTEM CONTROL METHOD, CONTROL APPARATUS, AND ENERGY STORAGE SYSTEM

CROSS-REFERENCE TO RELATED APPLICATION

This application is a continuation application of the PCT Application PCT/CN2022/121686 filed on Sep. 27, 2022, which is incorporated herein by reference in the entirety.

TECHNICAL FIELD

This application relates to the technical field of energy storage, and in particular, to an energy storage system control method, a control apparatus, and an energy storage system.

BACKGROUND

With the rapid development of the new energy industry, a large number of energy generation systems such as wind power and photovoltaic energy generation systems are connected to the power grid. In order to avoid waste caused by excessive energy output from an energy generation system, an energy storage system connected to the energy generation system is typically provided to store excess energy.

However, during the use of the energy storage system, the energy generation system charges the energy storage system in a continuous charging manner. After a long period of charge-discharge cycles, the batteries in the energy storage system incur lithium plating, heat generation, and other phenomena, thereby impairing the performance and service life of the batteries. Therefore, how to provide an energy storage system control method to improve the performance and service life of the energy storage system is a pressing technical challenge.

SUMMARY

This application provides an energy storage system control method, a control apparatus, and an energy storage system to improve the performance and service life of the energy storage system.

According to a first aspect, this application provides an energy storage system control method. The energy storage system includes a plurality of energy storage units. The energy storage system is coupled with an energy generation system and a power grid. The energy storage system is configured to store electrical energy obtained from the energy generation system and release the electrical energy to the power grid. The method includes: controlling, in a first stage, the energy generation system to charge a first energy storage unit in the plurality of energy storage units, where the first stage is a charging stage in a charging cycle of the first energy storage unit; and controlling, in a second stage, the first energy storage unit to discharge electricity to a second energy storage unit in the plurality of energy storage units, where the second stage is a discharging stage in the charging cycle of the first energy storage unit.

In this embodiment of this application, in the first stage of the charging cycle of the first energy storage unit, the energy generation system is controlled to charge the first energy storage unit, thereby fully utilizing the electrical energy output by the energy generation system and avoiding energy waste. In the second stage of the charging cycle of the first energy storage unit, the first energy storage unit is controlled to discharge electricity to the second energy storage unit, thereby alleviating the lithium plating and heat-up of the battery in the energy storage system, and in turn, improving the performance and service life of the battery. Therefore, the technical solution of this application can improve the performance and service life of the energy storage system.

In some embodiments, the controlling, in a first stage, the energy generation system to charge a first energy storage unit in the plurality of energy storage units includes: controlling, in the first stage, based on at least one of dispatch status of the power grid, an output power of the energy generation system, a charge power of the first energy storage unit, a remaining capacity of the first energy storage unit, or a remaining capacity of the second energy storage unit, the energy generation system to charge the first energy storage unit in the plurality of energy storage units. In this way, this makes it convenient to determine, based on different usage scenarios, a strategy for the energy generation system to charge the first energy storage unit.

In some embodiments, the controlling, based on at least one of dispatch status of the power grid, an output power of the energy generation system, a charge power of the first energy storage unit, a remaining capacity of the first energy storage unit, or a remaining capacity of the second energy storage unit, the energy generation system to charge the first energy storage unit in the plurality of energy storage units, includes: controlling, in a case that the remaining capacity of the first energy storage unit is less than a maximum preset capacity, the energy generation system to charge the first energy storage unit. In this way, the remaining capacity of the first energy storage unit can be maintained within an appropriate range, thereby avoiding overcharging caused by charging the first energy storage unit when the remaining capacity of the first energy storage unit is relatively high.

In some embodiments, the controlling, based on at least one of dispatch status of the power grid, an output power of the energy generation system, a charge power of the first energy storage unit, a remaining capacity of the first energy storage unit, or a remaining capacity of the second energy storage unit, the energy generation system to charge the first energy storage unit in the plurality of energy storage units, includes: controlling, in a case that the dispatch status of the power grid includes no requirement for energy dispatch, based on the output power of the energy generation system, the charge power of the first energy storage unit, and the remaining capacity of the second energy storage unit, the energy generation system to charge the first energy storage unit. In this way, in the case that no dispatch is required by the power grid, a strategy for charging the first energy storage unit can be determined based on the corresponding information.

In some embodiments, the controlling the energy generation system to charge a first energy storage unit in the plurality of energy storage units includes: controlling, in a case that the output power of the energy generation system is less than the charge power of the first energy storage unit, the energy generation system to charge the first energy storage unit, and controlling at least one of the second energy storage unit or the power grid to charge the first energy storage unit, where the remaining capacity of the second energy storage unit is greater than or equal to a minimum preset capacity. In this way, the second energy storage unit and/or the power grid together with the energy generation system can simultaneously charge the first energy storage unit in the first stage, so as to meet the charge power requirement of the first energy storage unit, and in turn, prolong the service life of the first energy storage unit.

In some embodiments, the controlling the energy generation system to charge a first energy storage unit in the plurality of energy storage units includes: controlling, in a case that the output power of the energy generation system is greater than or equal to the charge power of the first energy storage unit, the output power of the energy generation system to be identical to the charge power of the first energy storage unit; and controlling, after controlling the output power of the energy generation system to be identical to the charge power of the first energy storage unit, the energy generation system to charge the first energy storage unit.

In this implementation, in the case that the output power of the energy generation system is greater than or equal to the charge power of the first energy storage unit, the output power of the energy generation system is controlled to be identical to the charge power of the first energy storage unit. In addition, after the output power of the energy generation system is controlled to be identical to the charge power of the first energy storage unit, the energy generation system alone is controlled to charge the first energy storage unit. This implementation can meet the requirement of the first energy storage unit for the charge power, and is conducive to prolonging the service life of the first energy storage unit. In addition, this implementation is simple and easy to implement.

In some embodiments, the controlling the energy generation system to charge a first energy storage unit in the plurality of energy storage units includes: controlling, in a case that the remaining capacity of the second energy storage unit is less than a minimum preset capacity, the energy generation system and/or the power grid to charge the second energy storage unit. In this way, it is convenient to flexibly select, based on the actual conditions, a strategy for charging the second energy storage unit. In addition, after the second energy storage unit is charged to a specified state of charge, it is convenient to use the second energy storage unit to charge the first energy storage unit in the subsequent process.

In some embodiments, the controlling the energy generation system and/or the power grid to charge the second energy storage unit includes: controlling, in a case that the output power of the energy generation system is less than the charge power of the first energy storage unit, the energy generation system and the power grid to charge the first energy storage unit, and controlling the power grid to charge the second energy storage unit. In this way, the second energy storage unit is charged while charging the first energy storage unit, thereby making it convenient to use the second energy storage unit to charge the first energy storage unit after the second energy storage unit is charged to an appropriate state of charge.

In some embodiments, the controlling the energy generation system and/or the power grid to charge the second energy storage unit includes: controlling, in a case that the output power of the energy generation system is equal to the charge power of the first energy storage unit, the energy generation system to charge the first energy storage unit, and controlling the power grid to charge the second energy storage unit; and controlling, in a case that the output power of the energy generation system is greater than the charge power of the first energy storage unit, the energy generation system to charge the first energy storage unit, and controlling the energy generation system and/or the power grid to charge the second energy storage unit. In this way, it is convenient to select, based on the actual conditions, an appropriate control method to charge the first energy storage unit and supplement the state of charge of the second energy storage unit.

In some embodiments, the controlling, in a case that the output power of the energy generation system is greater than the charge power of the first energy storage unit, the energy generation system to charge the first energy storage unit, and controlling the energy generation system and/or the power grid to charge the second energy storage unit include: controlling, in a case that a difference between the output power of the energy generation system and the charge power of the first energy storage unit is less than a maximum charge power of the second energy storage unit, the energy generation system and the power grid to charge the second energy storage unit. In this way, it is convenient to implement fast charge for the second energy storage unit.

In some embodiments, the controlling, based on at least one of dispatch status of the power grid, an output power of the energy generation system, a charge power of the first energy storage unit, a remaining capacity of the first energy storage unit, or a remaining capacity of the second energy storage unit, the energy generation system to charge the first energy storage unit in the plurality of energy storage units, includes: controlling, in a case that the dispatch status of the power grid includes a requirement for energy dispatch and the output power of the energy generation system is greater than a required power of the power grid, based on the output power of the energy generation system, the charge power of the first energy storage unit, and the remaining capacity of the second energy storage unit, the energy generation system to charge the first energy storage unit.

In this implementation, in the case that the power grid requires dispatching and the output power of the energy generation system is greater than the required power of the power grid, the energy generation system is controlled to charge the first energy storage unit. In this way, the first energy storage unit can be charged while meeting the requirement of the power grid, thereby avoiding disruption of the stability of the power grid caused by the charging for the first energy storage unit.

In some embodiments, the controlling the energy generation system to charge a first energy storage unit in the plurality of energy storage units includes: controlling, in a case that the remaining capacity of the second energy storage unit is greater than or equal to a minimum preset capacity, the energy generation system to charge the first energy storage unit, or controlling the energy generation system and the second energy storage unit to charge the first energy storage unit. In this way, the second energy storage unit and/or the energy generation system can simultaneously charge the first energy storage unit in the first stage, so as to meet the charge power requirement of the first energy storage unit, and in turn, prolong the service life of the first energy storage unit.

In some embodiments, the controlling the energy generation system to charge a first energy storage unit in the plurality of energy storage units includes: controlling, in a case that the remaining capacity of the second energy storage unit is less than a minimum preset capacity, the energy generation system to charge the second energy storage unit; and controlling, after controlling the energy generation system to charge the second energy storage unit, the energy generation system and/or the second energy storage unit to charge the first energy storage unit. In this way, the remaining capacity of the second energy storage unit can be made greater than the minimum preset capacity, so as to meet the charge power requirement of the first energy storage unit when charging the first energy storage unit.

In some embodiments, the controlling, in a second stage, the first energy storage unit to discharge electricity to a second energy storage unit in the plurality of energy storage units includes: controlling, in the second stage, based on at least one of dispatch status of the power grid or a remaining capacity of the second energy storage unit, the first energy storage unit to discharge electricity to the second energy storage unit in the plurality of energy storage units. In this way, it is convenient to flexibly set different discharge strategies of the first energy storage unit during the charging cycle based on the actual conditions.

In some embodiments, the controlling, based on at least one of dispatch status of the power grid or a remaining capacity of the second energy storage unit, the first energy storage unit to discharge electricity to the second energy storage unit in the plurality of energy storage units includes: controlling, in a case that the remaining capacity of the second energy storage unit is less than a maximum preset capacity, the first energy storage unit to discharge electricity to the second energy storage unit. This can avoid the overcharging caused by excessive power received by the second energy storage unit.

In some embodiments, the controlling, based on at least one of dispatch status of the power grid or a remaining capacity of the second energy storage unit, the first energy storage unit to discharge electricity to the second energy storage unit in the plurality of energy storage units includes: controlling, in a case that the dispatch status of the power grid includes a requirement for energy dispatch, an output power of the energy generation system to be 0, and controlling the first energy storage unit to discharge electricity to the second energy storage unit. In this way, the discharge of electricity of the first energy storage unit to the power grid can be prevented from disrupting the stability of the power grid.

In some embodiments, the controlling, based on at least one of dispatch status of the power grid or a remaining capacity of the second energy storage unit, the first energy storage unit to discharge electricity to the second energy storage unit in the plurality of energy storage units includes: controlling, in a case that the dispatch status of the power grid includes a requirement for energy dispatch, an output power of the energy generation system to be equal to a required power of the power grid, and controlling the first energy storage unit to discharge electricity to the second energy storage unit. This implementation is simple and easy, and can simultaneously meet the requirement of the power grid and the requirement of the first energy storage unit that needs to discharge electricity to the second energy storage unit.

In some embodiments, the method further includes: controlling, in a case that a state of charge of the first energy storage unit reaches a first preset capacity, the first energy storage unit to switch from the first stage to the second stage; and controlling, in a case that a state of discharge of the first energy storage unit reaches a second preset capacity, the first energy storage unit to switch from the second stage to the first stage. In this way, the first energy storage unit is charged by continuously switching between the first stage and the second stage during the charging cycle of the first energy storage unit.

In some embodiments, the method further includes: controlling, in a case that a remaining capacity of the first energy storage unit reaches a maximum preset capacity, the energy generation system to stop charging the first energy storage unit. In this way, the remaining capacity of the first energy storage unit does not exceed the maximum preset capacity. After completion of charging the first energy storage unit, the energy generation system, used as an energy absorption apparatus, can receive the electricity discharged by other energy storage units in the plurality of energy storage units.

According to a second aspect, this application provides a control apparatus. The control apparatus is coupled to an energy storage system. The energy storage system is coupled with an energy generation system and a power grid. The energy storage system is configured to store electrical energy obtained from the energy generation system and release the electrical energy to the power grid. The energy storage system includes a plurality of energy storage units. The control apparatus includes a control unit. The control unit is configured to: control, in a first stage, the energy generation system to charge a first energy storage unit in the plurality of energy storage units, where the first stage is a charging stage in a charging cycle of the first energy storage unit; and control, in a second stage, the first energy storage unit to discharge electricity to a second energy storage unit in the plurality of energy storage units, where the second stage is a discharging stage in the charging cycle of the first energy storage unit.

In some embodiments, the control unit is further configured to control, in the first stage, based on at least one of dispatch status of the power grid, an output power of the energy generation system, a charge power of the first energy storage unit, a remaining capacity of the first energy storage unit, or a remaining capacity of the second energy storage unit, the energy generation system to charge the first energy storage unit in the plurality of energy storage units.

According to a third aspect, this application provides an energy storage system. The energy storage system is coupled with an energy generation system and a power grid. The energy storage system is configured to store electrical energy obtained from the energy generation system and release the electrical energy to the power grid. The energy storage system includes a plurality of energy storage units and the control apparatus disclosed in the second aspect or any implementation of the second aspect.

According to a fourth aspect, this application provides an energy storage system control apparatus. The control apparatus includes a memory and a processor. The memory is configured to store an instruction. The processor is configured to read the instruction and implement, based on the instruction, the method disclosed in the first aspect or any implementation of the first aspect. In this embodiment of this application, in the first stage of the charging cycle of the first energy storage unit, the energy generation system is controlled to charge the first energy storage unit, thereby fully utilizing the electrical energy output by the energy generation system and avoiding energy waste. In the second stage of the charging cycle of the first energy storage unit, the first energy storage unit is controlled to discharge electricity to the second energy storage unit, thereby alleviating the lithium plating and heat-up of the battery in the energy storage system, and in turn, improving the performance and service life of the battery. Therefore, the technical solution of this application can improve the performance and service life of the energy storage system.

BRIEF DESCRIPTION OF DRAWINGS

To describe the technical solutions of some embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

FIG. 5 is a schematic diagram of a control method according to an embodiment of this application;

FIG. 6 is a schematic diagram of a control method according to an embodiment of this application;

Figure 1:
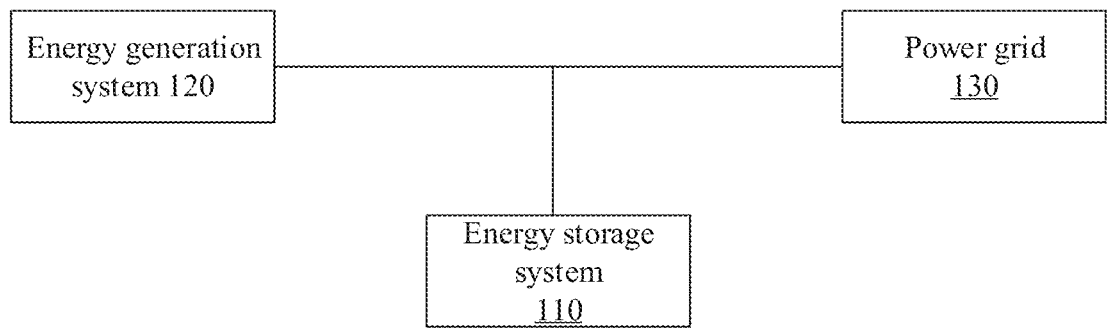
FIG. 1 is a schematic diagram of an application scenario of an energy storage system according to an embodiment of this application.

The drawings are not drawn to scale.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned device or component is necessarily located in the specified direction and position or constructed or operated in the specified direction and position. Therefore, such terms are not to be understood as a limitation on this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

The term "and/or" in this application indicates merely a relation for describing the related items, and represents three relationships. For example, "A and/or B" may represent the following three circumstances: A alone, both A and B, and B alone. In addition, the character "/" herein generally indicates an "or" relationship between the item preceding the character and the item following the character.

With the rapid development of the new energy industry, a large number of energy generation systems such as wind power and photovoltaic energy generation systems are connected to the power grid to provide electrical energy for the power grid. In a case that the energy generation system has generated a large amount of energy, in order to avoid waste caused by excessive energy output from an energy generation system, an energy storage system connected to the energy generation system is typically provided to store excess energy.

Researchers find that, during the use of the energy storage system, the energy generation system charges the energy storage system in a continuous charging manner. After a long period of charge-discharge cycles, the batteries in the energy storage system incur lithium plating, heat generation, and other phenomena, thereby impairing the performance and service life of the batteries.

In view of the situation above, this application provides an energy storage system control method. The energy storage system includes a plurality of energy storage units. The energy storage system is coupled with an energy generation system and a power grid. The energy storage system is configured to store electrical energy obtained from the energy generation system and release the electrical energy to the power grid. The control method includes: controlling, in a first stage, the energy generation system to charge a first energy storage unit in the plurality of energy storage units, where the first stage is a charging stage in a charging cycle of the first energy storage unit; and controlling, in a second stage, the first energy storage unit to discharge electricity to a second energy storage unit in the plurality of energy storage units, where the second stage is a discharging stage in the charging cycle of the first energy storage unit. In this way, by introducing a discharging stage in the charging cycle of the first energy storage unit, this application enables the first energy storage unit to discharge electricity to the second energy storage unit in the second stage after the first energy storage unit is charged to a specified state of charge in the first stage of the charging cycle, thereby alleviating the lithium plating and heat-up of the battery of the first energy storage unit in the energy storage system, improving the performance and service life of the battery, and in turn, improving the performance and service life of the energy storage system.

FIG. 1 is a schematic diagram of an application scenario of an energy storage system according to an embodiment of this application.

As shown in FIG. 1, the energy generation system 120 is connected to the energy storage system 110 and the power grid 130. The energy generation system 120 can transmit power to the energy storage system 110 and the power grid 130.

The energy generation system 120 can convert solar energy, wind energy, nuclear energy, and the like into electrical energy. The energy generation system 120 is a renewable energy system such as a wind power generation system, a photovoltaic power generation system, or a tidal power generation system; or a nuclear power generation system, a thermal power generation system, or a hydropower generation system; or a power generation system that is a combination of a wind power generation system and a thermal power generation system. This application does not limit the power generation form of the energy generation system 120.

The energy storage system 110 is configured to store electrical energy. The energy storage system 110 may include a plurality of energy storage units. In some embodiments, each energy storage unit may include at least one battery. A battery management system (BMS) is designed in each energy storage unit to monitor battery information such as the state of charge (SoC), temperature, current, voltage, and state of health (SoH), and exchange information with upper-level energy management system (EMS) or power conversion system (PCS) in real time to implement energy management of the entire energy storage system 110. The SoC of a battery is also referred to as the remaining capacity of the battery.

A battery may include a plurality of battery cells. The plurality of battery cells are connected in series, parallel, or series-and-parallel pattern to form the battery. The battery cell may be a minimum unit of the battery.

In some embodiments, the energy storage system 110 may further output power to an electrical device. The electrical device may be an electric vehicle or the like.

In some embodiments, the energy storage system 110 is connected to a power grid 130. The power grid 130 may be a distribution grid, a regional grid, or a power supply grid, without being limited herein. The power grid 130 may receive the power output by the energy storage system 110, or may transmit power to the energy storage system 110.

In some embodiments, the power grid 130 may be replaced by a user-side electrical device. The user-side electrical device is unable to output power to the energy storage system 110. In some embodiments, the user-side electrical device can receive the power output by the energy storage system 110 and/or the energy generation system 120.

Understandably, in an embodiment of this application, the energy storage system 110 being connected to the energy generation system 120, the energy storage system 110 being connected to the power grid 130, and the energy generation system 120 being connected to the power grid 130 may also be understood as the energy storage system 110 being coupled to the energy generation system 120, the energy storage system 110 being coupled to the power grid 130, and the energy generation system 120 being coupled to the power grid 130, respectively.

Figure 2:
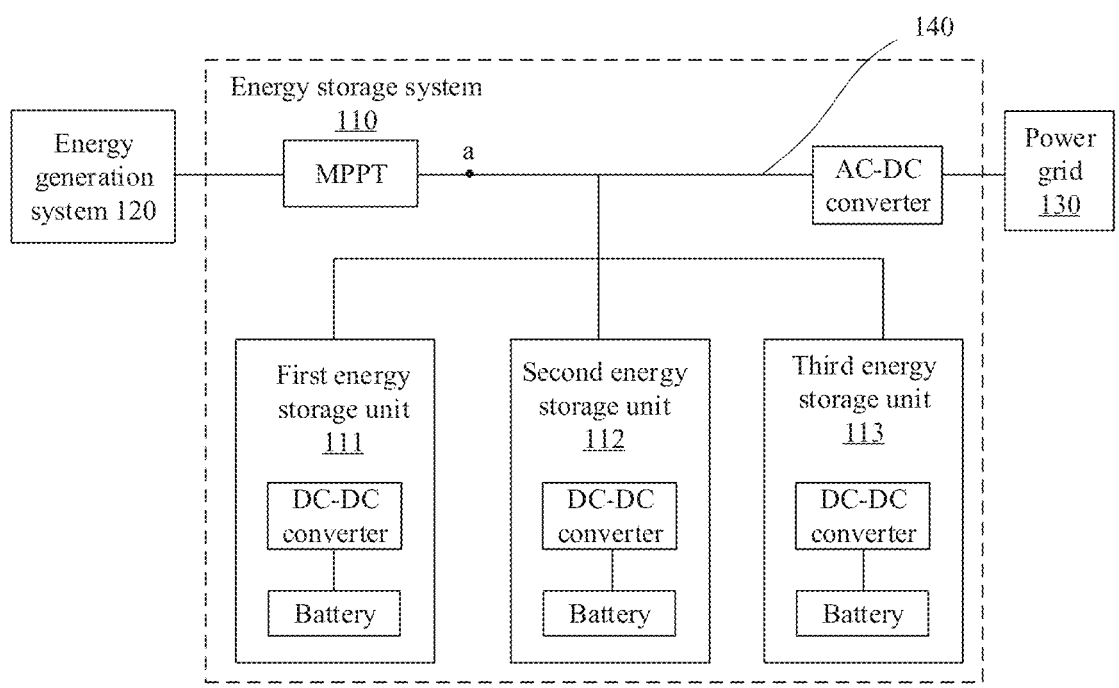
FIG. 2 is a schematic diagram of an architecture of an application scenario of an energy storage system according to an embodiment of this application.

FIG. 2 is a schematic diagram of an architecture of an application scenario of an energy storage system according to an embodiment of this application. As shown in FIG. 2, the energy generation system 120 in FIG. 2 is a photovoltaic power generation system illustrated as an example. It is hereby noted that the energy generation system 120 is not limited to a photovoltaic power generation system.

The output power of the energy generation system 120 is the power that is output after passing through a first controller. For example, for a photovoltaic power generation system, the first controller may be a maximum power point tracking (MPTT) solar controller. The MPTT solar controller can control the value of the output power of the energy generation system 120, and control whether the energy generation system 120 outputs power to the energy storage system 110 or the power grid 130. For example, the power of the energy generation system 120 is output to a bus 140 through the MPPT. In other words, the energy generation system 120 can output a direct current to the bus 140 under the control of the MPPT.

The power output by the power grid 130 may be output to the bus 140 through an alternating current-direct current (AC-DC) converter. The AC-DC converter is a bidirectional AC-DC converter, and can support fast switching between charge and discharge. The alternating current generated by the power grid 130 can be converted into a direct current by a bidirectional AC-DC converter and then output to the bus 140.

The energy storage system 110 includes a plurality of energy storage units. Each energy storage unit includes a battery and a direct current-direct current (DC-DC) converter. The DC-DC converter is a bidirectional DC-DC converter, and can support fast switching between charge and discharge, and can also convert the value of current or power to meet the charge power and the discharge power of the battery. Each energy storage unit can output power to the bus 140 through the DC-DC converter, and output power to other energy storage units through the DC-DC converter. In addition, the current or power of the bus 140 can also be transmitted to each energy storage unit through the DC-DC converter.

In each energy storage unit, the DC-DC converter can control the activation and deactivation of charging and discharging of the energy storage unit.

The DC-DC converter may be an isolated DC-DC converter or a non-isolated DC-DC converter.

Figures 3, 4:
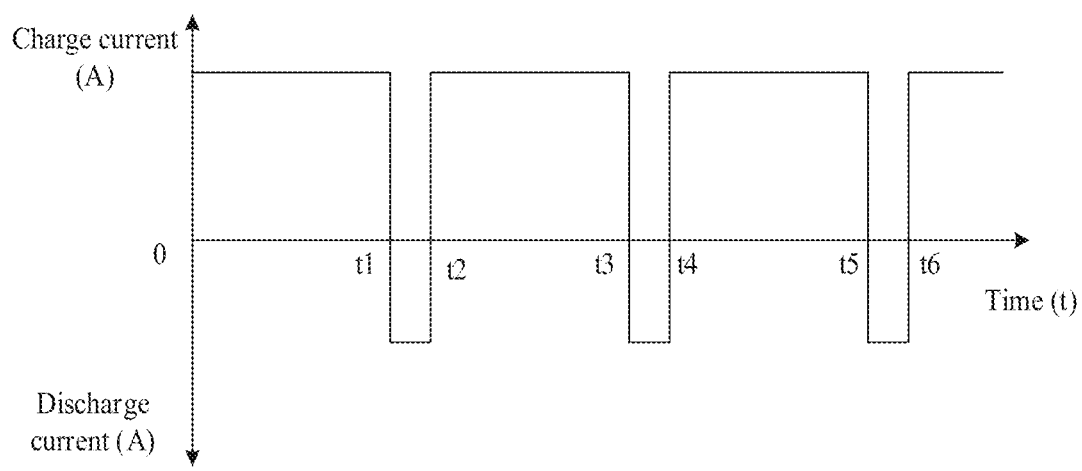
FIG. 3 is a schematic diagram of an energy storage system control method according to an embodiment of this application.
FIG. 4 is a schematic diagram of a charging cycle of a first energy storage unit according to an embodiment of this application.

FIG. 3 is a schematic diagram of an energy storage system control method according to an embodiment of this application. In an embodiment of this application, as shown in FIG. 3, the control method 300 includes the following operations:

The control method 300 in this embodiment of this application is applicable to an energy storage system 110 shown in FIG. 1 and FIG. 2. The energy storage system 110 is coupled with an energy generation system 120 and a power grid 130. The energy storage system 110 is configured to store electrical energy obtained from the energy generation system 120 and release the electrical energy to the power grid 130. The energy storage system 110 includes a plurality of energy storage units.

The control method 300 in this embodiment is performed by a control apparatus. The control apparatus may be disposed in the energy storage system 110, or in the energy generation system 120, or independently disposed outside the energy storage system 110 and the energy generation system 120. The positioning of the control apparatus depends on actual conditions, and is not particularly limited herein.

Operation 310: Control, in a first stage, an energy generation system 120 to charge a first energy storage unit 111 in a plurality of energy storage units, where the first stage is a charging stage in a charging cycle of the first energy storage unit 111.

In some embodiments, operation 310 may implemented through the following operations. For example, the control apparatus controls the MPPT to output the power of the energy generation system 120 to the bus 140. Subsequently, the control apparatus controls a DC-DC converter in the first energy storage unit 111 to convert a direct current on the bus 140 side into a charge current of the first energy storage unit 111 and output the current to the first energy storage unit 111.

In operation 310, the energy generation system 120 is controlled to charge the first energy storage unit 111, thereby fully utilizing the electrical energy generated by the energy generation system 120 and avoiding energy waste.

Operation 320: Control, in a second stage, the first energy storage unit 111 to discharge electricity to a second energy storage unit 112 in the plurality of energy storage units, where the second stage is a discharging stage in the charging cycle of the first energy storage unit 111.

In some embodiments, operation 320 may implemented through the following operations. For example, the control apparatus exercises control to activate the DC-DC converter of the first energy storage unit 111 and the DC-DC converter of the second energy storage unit 112, so as to output the power of the first energy storage unit 111 to the second energy storage unit 112.

FIG. 4 is a schematic diagram of a charging cycle of a first energy storage unit according to an embodiment of this application. As shown in FIG. 4, the charging cycle of the first energy storage unit 111 includes a plurality of first stages and second stages that recur sequentially. In the first stage, the first energy storage unit 111 is charged to supplement the state of charge of the first energy storage unit 111. In the second stage, the first energy storage unit 111 is discharged to reduce or eliminate the accumulated polarization of the battery in the first energy storage unit 111, thereby alleviating lithium plating and reducing the accumulated heat caused by the charging for the first energy storage unit 111.

In different first stages, the charge power of the first energy storage unit 111 may vary, and the state of charge added may vary, all being determinable by the BMS based on the battery information of the battery of the first energy storage unit. Similarly, in different second stages, the discharge power of the first energy storage unit 111 and the state of discharge released may vary.

The durations of different first stages and different second stages may be the same or different, and configurable based on actual conditions.

In operation 320, the first energy storage unit 111 is controlled to discharge electricity to the second energy storage unit 112, thereby alleviating lithium plating and heat-up of the battery in the energy storage system 110, and improving the performance and service life of the battery. In addition, compared with the practice of controlling the first energy storage unit 111 to discharge electricity to the power grid 130, the practice of controlling the first energy storage unit 111 to discharge electricity to the second energy storage unit 112 is easier to implement, poses less impact on the power grid 130, and avoids disruption of the stability of the power grid 130.

An embodiment of this application provides a control method 300. The control method includes: controlling, in a first stage, the energy generation system 120 to charge a first energy storage unit 111 in the plurality of energy storage units, where the first stage is a charging stage in a charging cycle of the first energy storage unit 111; and controlling, in a second stage, the first energy storage unit 111 to discharge electricity to a second energy storage unit 112 in the plurality of energy storage units, where the second stage is a discharging stage in the charging cycle of the first energy storage unit 111. In this way, on the one hand, the electrical energy generated by the energy generation system 120 can be fully utilized to avoid energy waste. On the other hand, lithium plating and heat-up of the battery in the energy storage system 110 are alleviated, and the performance and service life of the battery are improved. Therefore, the technical solution of this application can improve the performance and service life of the energy storage system 110.

In some embodiments, in the first stage, just other energy storage units in the energy storage system 110 other than the first energy storage unit 111 may be controlled to charge the first energy storage unit 111. In this way, the first energy storage unit 111 can be charged by other energy storage units, thereby implementing heating for the battery of the first energy storage unit 111.

FIG. 5 is a schematic diagram of a control method according to an embodiment of this application. In some embodiments, in an embodiment of this application, as shown in FIG. 5, operation 310 includes operation 311.

Operation 311: Control, in the first stage, based on at least one of dispatch status of the power grid 130, an output power of the energy generation system 120, a charge power of the first energy storage unit 111, a remaining capacity of the first energy storage unit 111, or a remaining capacity of the second energy storage unit 112, the energy generation system 120 to charge the first energy storage unit 111 in the plurality of energy storage units.

The charge power of the first energy storage unit 111 may be determined based on the battery information of the battery in the first energy storage unit 111. The battery information may include the voltage of each battery cell in the battery, the temperature of the battery cell, the SoH of the battery cell and the battery, the SoC of the battery cell and the battery, and the like. The BMS in the first energy storage unit 111 may determine the charge current and charge power of the first energy storage unit 111 based on the battery information. For example, the BMS may obtain the battery information in real time and determine the most appropriate charge power for the first energy storage unit 111 based on the battery information.

After determining the charge power of the first energy storage unit 111, the BMS may send the charge power to the control apparatus. For example, the BMS sends the charge power to the control apparatus by means of controller area network (Controller Area Network, CAN) communication.

The output power of the energy generation system 120 is the power on the output side of the energy generation system 120, for example, the output power at the position a in FIG. 2. The output power of the energy generation system 120 may be controlled by a first controller, for example, by an MPPT.

The remaining capacity of the first energy storage unit 111 and the remaining capacity of the second energy storage unit 112 mean the SoC of the first energy storage unit 111 and the SoC of the second energy storage unit 112, respectively.

In this embodiment, it is convenient to determine, based on the information such as the dispatch status of the power grid 130, the output power of the energy generation system 120, the charge power of the first energy storage unit 111, the remaining capacity of the first energy storage unit 111, or the remaining capacity of the second energy storage unit 112, a strategy for the energy generation system 120 to charge the first energy storage unit 111.

In some embodiments, before operation 310, the method 300 further includes: obtaining at least one of the dispatch status of the power grid 130, the output power of the energy generation system 120, the charge power of the first energy storage unit 111, the remaining capacity of the first energy storage unit 111, or the remaining capacity of the second energy storage unit 112.

In some embodiments, in an embodiment of this application, operation 311 includes: controlling, in a case that the remaining capacity of the first energy storage unit 111 is less than a maximum preset capacity, the energy generation system 120 to charge the first energy storage unit 111.

The maximum preset capacity may be a maximum SoC of the battery of the first energy storage unit 111. The SOC may be set based on actual needs. For example, the SOC is 0.8, 0.9, or the like.

In this embodiment, the remaining capacity of the first energy storage unit 111 may be maintained within an appropriate range, thereby avoiding overcharging caused by charging the first energy storage unit 111 when the remaining capacity of the first energy storage unit 111 is relatively high.

FIG. 6 is a schematic diagram of a control method according to an embodiment of this application. In some embodiments, in an embodiment of this application, as shown in FIG. 6, operation 311 includes operation 312.

Operation 312: Control, in a case that the dispatch status of the power grid 130 includes no requirement for energy dispatch, based on the output power of the energy generation system 120, the charge power of the first energy storage unit 111, and the remaining capacity of the second energy storage unit 112, the energy generation system 120 to charge the first energy storage unit 111.

The case that the dispatch status of the power grid 130 includes no requirement for energy dispatch may be a case in which the power grid 130 does not require the energy generation system 120 or the energy storage system 110 to transmit power to the power grid 130.

In this embodiment, in a case that the power grid 130 requires no dispatch, based on a relationship between the output power P2 of the energy generation system 120 and the charge power P1 of the first energy storage unit 111 and based on the remaining capacity of the second energy storage unit 112, it is convenient to determine a strategy for charging the first energy storage unit 111.

In some embodiments, in an embodiment of this application, operation 312 includes: control, in a case that the output power of the energy generation system 120 is less than the charge power of the first energy storage unit 111, the energy generation system 120 to charge the first energy storage unit 111, and control at least one of the second energy storage unit 112 or the power grid 130 to charge the first energy storage unit 111, where the remaining capacity of the second energy storage unit 112 is greater than or equal to a minimum preset capacity.

The minimum preset capacity may be set based on actual needs. For example, the SoC of the battery in the second energy storage unit 112 corresponding to the minimum preset capacity of the second energy storage unit 112 is 0.5.

In a case that the remaining capacity of the second energy storage unit 112 is greater than or equal to the minimum preset capacity, the second energy storage unit 112 may serve as an energy supplementing apparatus to charge the first energy storage unit. In a case that the output power of the energy generation system 120 is less than the charge power of the first energy storage unit 111, other apparatuses in addition to the energy generation system 120 still need to charge the first energy storage unit 111.

In some embodiments, in a time period of low electricity consumption, the energy generation system 120 and the power grid 130 charge the first energy storage unit simultaneously, thereby being more economical.

In some embodiments, in a case that a sum of the maximum output power P3 of the second energy storage unit 112 and the output power P2 of the energy generation system 120 is greater than or equal to the charge power P1 of the first energy storage unit 111, the energy generation system 120 and the second energy storage unit 112 simultaneously charge the first energy storage unit 111, and the power grid 130 does not charge the first energy storage unit 111. In this way, the power grid 130 does not need to charge the first energy storage unit 111. This charging strategy is simple and easy, and avoids affecting the normal operation and stability of the power grid 130.

In some embodiments, in a case that the sum of the maximum output power P3 of the second energy storage unit 112 and the output power of the energy generation system 120 is less than the charge power of the first energy storage unit 111, the energy generation system 120, the power grid 130, and the second energy storage unit 112 charge the first energy storage unit 111 simultaneously.

In some embodiments, in order for the energy generation system 120, the power grid 130, and the second energy storage unit 112 to charge the first energy storage unit 111 simultaneously, the following operations may be performed: The control apparatus controls the first controller such as MPPT to output the output power of the energy generation system 120 to the bus 140; the control apparatus controls the DC-DC converter of the second energy storage unit 112 to output the power of the second energy storage unit 112 to the bus 140; the control apparatus controls the AC-DC converter to output the power of the power grid 130 to the bus 140; and the control apparatus controls the DC-DC converter of the first energy storage unit 111 to convert the power (direct current) on the bus 140 side and output the power to the first energy storage unit 111.

In this embodiment, the second energy storage unit 112 and/or the power grid 130 together with the energy generation system 120 can simultaneously charge the first energy storage unit 111 in the first stage, so as to meet the charge power requirement of the first energy storage unit 111, and in turn, prolong the service life of the first energy storage unit 111.

In some embodiments, in an embodiment of this application, operation 312 includes: in the case that the output power of the energy generation system 120 is greater than or equal to the charge power of the first energy storage unit 111, controlling the output power of the energy generation system 120 to be identical to the charge power of the first energy storage unit 111; and, after controlling the output power of the energy generation system 120 to be identical to the charge power of the first energy storage unit 111, controlling the energy generation system 120 to charge the first energy storage unit 111.

In this embodiment, in the case that the output power of the energy generation system 120 is greater than or equal to the charge power of the first energy storage unit 111, the output power of the energy generation system 120 is controlled to be identical to the charge power of the first energy storage unit 111; and, after the output power of the energy generation system 120 is controlled to be identical to the charge power of the first energy storage unit 111, the energy generation system 120 alone is controlled to charge the first energy storage unit 111. In this way, this implementation meets the requirement of the first energy storage unit 111 for the charge power, and is conducive to prolonging the service life of the first energy storage unit 111. In addition, this implementation is simple and easy to implement.

In some embodiments, in an embodiment of this application, operation 312 includes: controlling, in a case that the remaining capacity of the second energy storage unit 112 is less than a minimum preset capacity, the energy generation system 120 and/or the power grid 130 to charge the second energy storage unit 112. In this way, it is convenient to flexibly select, based on the actual conditions, a strategy for charging the second energy storage unit 112. In addition, after the second energy storage unit 112 is charged to a specified state of charge, it is convenient to use the second energy storage unit 112 to charge the first energy storage unit 111 in the subsequent process.

In some embodiments, in an embodiment of this application, "controlling, in a case that the remaining capacity of the second energy storage unit 112 is less than a minimum preset capacity, the energy generation system 120 and/or the power grid 130 to charge the second energy storage unit 112" includes: controlling, in the case that the output power of the energy generation system 120 is less than the charge power of the first energy storage unit 111, the energy generation system 120 and the power grid 130 to charge the first energy storage unit 111, and controlling the power grid 130 to charge the second energy storage unit 112.

In this embodiment, the second energy storage unit 112 is charged while charging the first energy storage unit 111, thereby making it convenient to use the second energy storage unit 112 to charge the first energy storage unit 111 after the second energy storage unit 112 is charged to an appropriate state of charge.

In some embodiments, in a case that the output power of the energy generation system 120 is less than the charge power of the first energy storage unit 111, the energy generation system 120 and the power grid 130 are controlled to charge the first energy storage unit 111, but not to charge the second energy storage unit 112.

In some embodiments, in an embodiment of this application, "controlling, in a case that the remaining capacity of the second energy storage unit 112 is less than a minimum preset capacity, the energy generation system 120 and/or the power grid 130 to charge the second energy storage unit 112" includes: controlling, in the case that the output power of the energy generation system 120 is equal to the charge power of the first energy storage unit 111, the energy generation system 120 to charge the first energy storage unit 111, and controlling the power grid 130 to charge the second energy storage unit 112; and, controlling, in the case that the output power of the energy generation system 120 is greater than the charge power of the first energy storage unit 111, the energy generation system 120 to charge the first energy storage unit 111, and controlling the energy generation system 120 and/or the power grid 130 to charge the second energy storage unit 112.

In this embodiment, it is convenient to select, based on the actual conditions, an appropriate control method to charge the first energy storage unit 111 and supplement the state of charge of the second energy storage unit 112.

In some embodiments, in an embodiment of this application, the controlling, in a case that the output power of the energy generation system 120 is greater than the charge power of the first energy storage unit 111, the energy generation system 120 to charge the first energy storage unit 111, and controlling the energy generation system 120 and/or the power grid 130 to charge the second energy storage unit 112 include: controlling, in a case that a difference between the output power of the energy generation system 120 and the charge power of the first energy storage unit 111 is less than a maximum charge power of the second energy storage unit 112, the energy generation system 120 and the power grid 130 to charge the second energy storage unit 112. In this way, it is convenient to implement fast charge for the second energy storage unit 112.

In some embodiments, in an embodiment of this application, operation 311 includes: controlling, in a case that the dispatch status of the power grid 130 includes a requirement for energy dispatch and the output power of the energy generation system 120 is greater than a required power of the power grid 130, based on the output power of the energy generation system 120, the charge power of the first energy storage unit 111, and the remaining capacity of the second energy storage unit 112, the energy generation system 120 to charge the first energy storage unit 111.

When the power grid 130 requires energy dispatch, the power grid 130 may send the energy dispatch requirement to at least one of the energy generation system 120 or the energy storage system 110. In some embodiments, the power grid 130 preferentially sends the energy dispatch requirement to the energy generation system 120. In some embodiments, in a case that the output power of the energy generation system 120 does not meet the dispatch requirement of the power grid 130, the power grid 130 may send the dispatch requirement to the energy storage system 110 additionally.

In this embodiment, in the case that the power grid 130 requires dispatching and the output power of the energy generation system 120 is greater than the required power of the power grid 130, the energy generation system 120 is controlled to charge the first energy storage unit 111. In this way, the first energy storage unit 111 can be charged while meeting the requirement of the power grid 130, thereby avoiding the failure to meet the requirement of the power grid 130 due to the charging for the first energy storage unit 111, and in turn, avoiding disruption of the stability of the power grid 130.

In some embodiments, in an embodiment of this application, the controlling the energy generation system 120 to charge a first energy storage unit 111 in the plurality of energy storage units includes: controlling, in a case that the remaining capacity of the second energy storage unit 112 is greater than or equal to a minimum preset capacity, the energy generation system 120 to charge the first energy storage unit 111, or controlling the energy generation system 120 and the second energy storage unit 112 to charge the first energy storage unit 111. In this way, the second energy storage unit 112 and/or the energy generation system 120 can simultaneously charge the first energy storage unit 111 in the first stage, so as to meet the charge power requirement of the first energy storage unit 111, and in turn, prolong the service life of the first energy storage unit 111.

In some embodiments, in a case that a difference between the output power of the energy generation system 120 and the required power of the power grid 130 is greater than or equal to the charge power of the first energy storage unit 111, the energy generation system 120 may charge the first energy storage unit 111.

In some embodiments, when the difference between the output power P2 of the energy generation system 120 and the required power P4 of the power grid 130 is less than the charge power P1 of the first energy storage unit 111, the second energy storage unit 112 and the energy generation system 120 are controlled to simultaneously charge the first energy storage unit 111 in the first stage. In this case, the power transmitted by the energy generation system 120 to the first energy storage unit 111 is P2−P4, and the power transmitted by the second energy storage unit 112 to the first energy storage unit 111 is P1−(P2−P4).

In some embodiments, in an embodiment of this application, the controlling the energy generation system 120 to charge a first energy storage unit 111 in the plurality of energy storage units includes: controlling, in a case that the remaining capacity of the second energy storage unit 112 is less than a minimum preset capacity, the energy generation system 120 to charge the second energy storage unit 112; and controlling, after controlling the energy generation system 120 to charge the second energy storage unit 112, the energy generation system 120 and/or the second energy storage unit 112 to charge the first energy storage unit 111. In this way, the remaining capacity of the second energy storage unit 112 can be made greater than the minimum preset capacity, so as to meet the charge power requirement of the first energy storage unit 111 when charging the first energy storage unit 111.

In some embodiments, in the case that the remaining capacity of the second energy storage unit 112 is less than the minimum preset capacity, the energy generation system 120 may be further controlled to charge the first energy storage unit 111 and the second energy storage unit 112 simultaneously. It is hereby noted that the charge power of the first energy storage unit 111 is an appropriate charge power calculated by the BMS, and the charge power of the second energy storage unit 112 may be any value that does not exceed the maximum charge power of the second energy storage unit 112.

In some embodiments, in an embodiment of this application, the controlling, in a second stage, the first energy storage unit 111 to discharge electricity to a second energy storage unit 112 in the plurality of energy storage units includes: controlling, in the second stage, based on at least one of dispatch status of the power grid 130 or a remaining capacity of the second energy storage unit 112, the first energy storage unit 111 to discharge electricity to the second energy storage unit 112 in the plurality of energy storage units. In this way, it is convenient to flexibly set different discharge strategies of the first energy storage unit 111 during the charging cycle based on the actual conditions.

In some embodiments, in an embodiment of this application, the controlling, based on at least one of dispatch status of the power grid 130 or a remaining capacity of the second energy storage unit 112, the first energy storage unit 111 to discharge electricity to the second energy storage unit 112 in the plurality of energy storage units includes: controlling, in a case that the remaining capacity of the second energy storage unit 112 is less than a maximum preset capacity, the first energy storage unit 111 to discharge electricity to the second energy storage unit 112. This can avoid the overcharging caused by excessive power received by the second energy storage unit 112.

In some embodiments, in an embodiment of this application, the controlling, based on at least one of dispatch status of the power grid 130 or a remaining capacity of the second energy storage unit 112, the first energy storage unit 111 to discharge electricity to the second energy storage unit 112 in the plurality of energy storage units includes: controlling, in a case that the dispatch status of the power grid 130 includes no requirement for energy dispatch, an output power of the energy generation system 120 to be 0, and controlling the first energy storage unit 111 to discharge electricity to the second energy storage unit 112. In this way, the discharge of electricity of the first energy storage unit 111 to the power grid 130 can be prevented from disrupting the stability of the power grid 130.

In some embodiments, in an embodiment of this application, the controlling, based on at least one of dispatch status of the power grid 130 or a remaining capacity of the second energy storage unit 112, the first energy storage unit 111 to discharge electricity to the second energy storage unit 112 or the third energy storage unit 113 in the plurality of energy storage units includes: controlling, in a case that the dispatch status of the power grid 130 includes a requirement for energy dispatch, an output power of the energy generation system 120 to be equal to a required power of the power grid 130, and controlling the first energy storage unit 111 to discharge electricity to the second energy storage unit 112. This implementation is simple and easy, and can simultaneously meet the requirement of the power grid 130 and the requirement of the first energy storage unit 111 that needs to discharge electricity to the second energy storage unit 112.

In some embodiments, in an embodiment of this application, the method further includes: controlling, in a case that a state of charge of the first energy storage unit 111 reaches a first preset capacity, the first energy storage unit 111 to switch from the first stage to the second stage; and controlling, in a case that a state of discharge of the first energy storage unit 111 reaches a second preset capacity, the first energy storage unit 111 to switch from the second stage to the first stage. In this way, the first energy storage unit 111 is charged by continuously switching between the first stage and the second stage during the charging cycle of the first energy storage unit 111.

The first preset capacity and the second preset capacity may be set based on the actual needs, and are not particularly limited herein.

In some embodiments, the first preset capacity is greater than the second preset capacity. In some embodiments, the time of the first stage is less than the time of the second stage.

In some embodiments, in different first stages, the charge power of the first energy storage unit 111 may vary, or may be determined based on the battery information of the first energy storage unit 111.

In some embodiments, in an embodiment of this application, the method further includes: controlling, in a case that the remaining capacity of the first energy storage unit 111 reaches a maximum preset capacity, the energy generation system 120 to stop charging the first energy storage unit 111. In this way, the remaining capacity of the first energy storage unit 111 does not exceed the maximum preset capacity. After completion of charging the first energy storage unit 111, the energy generation system 120, used as an energy absorption apparatus, can receive the electricity discharged by other energy storage units in the plurality of energy storage units.

In this application, after the remaining capacity of the first energy storage unit 111 reaches the maximum preset capacity and the energy generation system 120 is controlled to stop charging the first energy storage unit 111, the control apparatus no longer controls the energy generation system 120 to charge the first energy storage unit 111. In other words, the first energy storage unit 111 serves as an energy absorption apparatus to absorb the electrical power released by the remaining energy storage units during the discharge stage of the charging cycle. At the same time, the first energy storage unit 111 does not charge the remaining energy storage units.

The foregoing describes in detail the method embodiment of this application with reference to FIG. 1 to FIG. 6, and the following describes in detail some embodiments of a control apparatus of this application. Understandably, the method embodiment corresponds to the control apparatus embodiment. For similar descriptions, reference may be made to the method embodiment, the details of which are omitted here.

Figure 7:
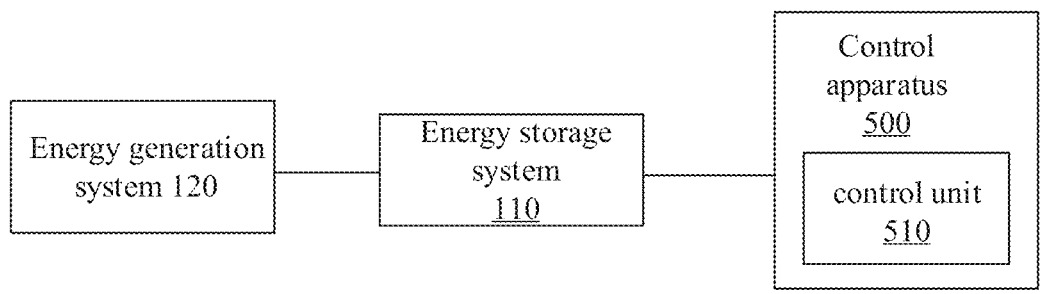
FIG. 7 is a schematic diagram of a control apparatus according to an embodiment of this application.

FIG. 7 is a schematic diagram of a control apparatus according to an embodiment of this application. As shown in FIG. 7, this application provides a control apparatus 500. The control apparatus 500 is coupled to an energy storage system 110. The energy storage system 110 is coupled with an energy generation system 120 and a power grid 130. The energy storage system 110 is configured to store electrical energy obtained from the energy generation system 120 and release the electrical energy to the power grid 130. The energy storage system 110 includes a plurality of energy storage units. The control apparatus 500 includes a control unit 510. The control unit 510 is configured to: control, in a first stage, the energy generation system 120 to charge a first energy storage unit 111 in the plurality of energy storage units, where the first stage is a charging stage in a charging cycle of the first energy storage unit 111; and control, in a second stage, the first energy storage unit 111 to discharge electricity to a second energy storage unit 112 in the plurality of energy storage units, where the second stage is a discharging stage in the charging cycle of the first energy storage unit 111.

In some embodiments, in an embodiment of this application, the control unit 510 is further configured to: control, in the first stage, based on at least one of dispatch status of the power grid 130, an output power of the energy generation system 120, a charge power of the first energy storage unit 111, a remaining capacity of the first energy storage unit 111, or a remaining capacity of the second energy storage unit 112, the energy generation system 120 to charge the first energy storage unit 111 in the plurality of energy storage units.

In some embodiments, the control unit 510 is further configured to perform any one of the control methods described above. Similar descriptions can be found above and will not be repeated here.

Figure 8:
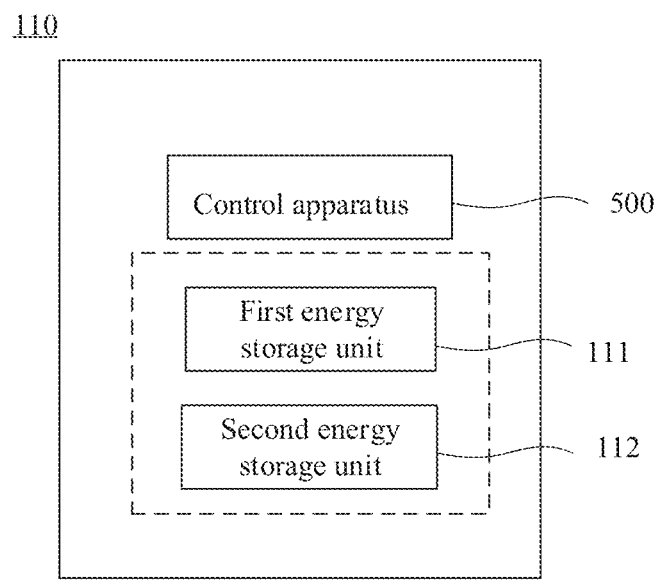
FIG. 8 is a schematic diagram of an energy storage system according to an embodiment of this application.

FIG. 8 is a schematic diagram of an energy storage system according to an embodiment of this application. As shown in FIG. 8, this application provides an energy storage system 110. The energy storage system 110 is coupled with an energy generation system 120 and a power grid 130. The energy storage system 110 is configured to store electrical energy obtained from the energy generation system 120 and release the electrical energy to the power grid 130. The energy storage system 110 includes a plurality of energy storage units and the control apparatus 500 described above.

The energy storage system 110 includes a plurality of energy storage units, for example, two energy storage units, that is, a first energy storage unit 111 and a second energy storage unit 112. The two energy storage units connected in parallel. In some embodiments, the energy storage system 110 may further include three or more energy storage units.

The control apparatus 500 may be connected to a plurality of energy storage units in a wireless or wired manner. This embodiment of this application does not impose any specific limitation on the connection method.

Figure 9:
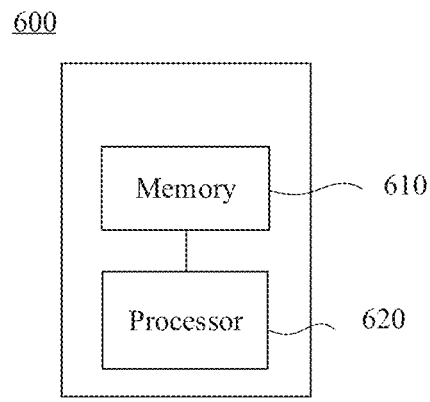
FIG. 9 is a schematic diagram of a control apparatus according to an embodiment of this application.

FIG. 9 is a schematic diagram of a control apparatus according to an embodiment of this application. As shown in FIG. 9, this application provides an energy storage system control apparatus 600. The control apparatus 600 includes a memory 610 and a processor 620. The memory 610 is configured to store an instruction. The processor 620 is configured to read the instruction and implement the foregoing method based on the instruction.

The processor 620 in this embodiment of this application may be an integrated circuit chip capable of processing signals. In an implementation process, operations in the foregoing method embodiment can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA), or another programmable logical device, a discrete gate, or a transistor logical device, or a discrete hardware component. The processor can implement or perform the methods and operations disclosed in an embodiment of this application. The general-purpose processor may be a microprocessor, or the processor may be any conventional processor or the like. The operations of the method disclosed in an embodiment of this application may be directly performed by a hardware decoding processor, or performed by a combination of hardware and software modules in the decoding processor. The software modules may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the operations of the method in combination with hardware of the processor.

The memory 610 in an embodiment of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. By way of example but not limitation, many forms of RAM are available, for example, static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchronous link dynamic random access memory (SLDRAM), and direct Rambus random access memory (DR RAM). It is hereby noted that the memory of the systems and methods described herein is intended to include, but is not limited to, such memories and any other appropriate types of memories.

This application further provides a computer-readable storage medium, configured to store a computer program.

In some embodiments, the computer-readable storage medium is applicable to the energy storage system control apparatus disclosed in an embodiment of this application. When run on a computer, the computer program causes the computer to execute the corresponding processes implemented by the control apparatus in each method disclosed in an embodiment of this application, the details of which are omitted here for brevity.

An embodiment of this application further provides a computer program product, including a computer program instruction.

In some embodiments, the computer program product is applicable to the energy storage system control apparatus disclosed in an embodiment of this application. When run on a computer, the computer program instruction causes the computer to execute the corresponding processes implemented by the energy storage system control apparatus in each method disclosed in an embodiment of this application, the details of which are omitted here for brevity.

An embodiment of this application further provides a computer program.

In some embodiments, the computer program is applicable to the energy storage system control apparatus disclosed in an embodiment of this application. When run on a computer, the computer program causes the computer to execute the corresponding processes implemented by the energy storage system control apparatus in each method disclosed in an embodiment of this application, the details of which are omitted here for brevity.

A person of ordinary skill in the art is aware that the exemplary units and algorithm operations described with reference to an embodiment disclosed herein can be implemented by electronic hardware or by a combination of computer software and electronic hardware. Whether the functions are performed by hardware or software depends on particular applications and design constraint conditions of the technical solutions. A person skilled in the art may use different methods to implement the described functions for each particular application, but such implementation still falls within the scope of this application.

A person skilled in the art clearly understands that, for ease and brevity of description, a detailed working process of the foregoing system, apparatus, and unit may be learned by reference to a corresponding process in the foregoing method embodiments, details of which are omitted here.

In the several embodiments provided in this application, it is understandable that the disclosed system, apparatus, and method may be implemented in other manners. For example, the described device embodiment is merely illustrative. For example, the division of the device into several units is merely a type of logic function division, and the device may be divided in other manners in practical implementations. For example, a plurality of units or components may be combined or integrated into another system, or some features may be ignored or skipped. In addition, a mutual coupling or direct coupling or communication connection illustrated or discussed herein may be an indirect coupling or communication connection implemented through some interfaces, devices, or units, and may be in electrical, mechanical or other forms.

The units described as discrete components may be physically separated or not, and the components illustrated as units may be physical units or not, and specifically, may be located in one place or distributed on a plurality of network elements. Some or all of the units may be selected according to actual needs to achieve the objectives of a technical solution in an embodiment of this application.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the essence of the technical solution of this application, or the part making contributions to the prior art, or a part of the technical solution may be embodied in the form of a software product. The computer software product is stored in a storage medium, and includes several instructions for instructing a computer device (such as a personal computer, a server, a network device) to perform all or part of the operations of the method described in each embodiment of this application. The storage medium includes various media capable of storing program code, such as a USB flash disk, removable hard disk, ROM, RAM, magnetic disk, or optical disk.

Although this application has been described with reference to exemplary embodiments, various improvements may be made to the embodiments without departing from the scope of this application, and some components described in the embodiments may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A method for controlling an energy storage system, the method comprising:
   controlling, in a first stage, an energy generation system to charge a first energy storage unit in a plurality of energy storage units of the energy storage system, wherein the first stage is a charging stage in a charging cycle of the first energy storage unit and wherein the energy storage system is coupled with the energy generation system and a power grid, and is configured to store electrical energy from the energy generation system and release the electrical energy to the power grid; and
   controlling, in a second stage, the first energy storage unit to discharge electricity to a second energy storage unit in the plurality of energy storage units, wherein the second stage is a discharging stage in the charging cycle of the first energy storage unit,
   wherein the controlling, in the first stage, the energy generation system to charge the first energy storage unit in the plurality of energy storage units comprises:
      controlling, in a case that at least one dispatch status of the power grid comprises no requirement for energy dispatch, based on an output power of the energy generation system, a charge power of the first energy storage unit, and a remaining capacity of the second energy storage unit, the energy generation system to charge the first energy storage unit;
      controlling, in a case that the remaining capacity of the second energy storage unit is less than a minimum preset capacity, the energy generation system and/or the power grid to charge the second energy storage unit,
   wherein the controlling the energy generation system and/or the power grid to charge the second energy storage unit further comprises:
      controlling, in a case that the output power of the energy generation system is equal to the charge power of the first energy storage unit, the energy generation system to charge the first energy storage unit, and controlling the power grid to charge the second energy storage unit; and
      controlling, in a case that the output power of the energy generation system is greater than the charge power of the first energy storage unit, the energy generation system to charge the first energy storage unit, and controlling the energy generation system and/or the power grid to charge the second energy storage unit.

2. The control method according to claim 1, wherein the controlling the energy generation system to charge the first energy storage unit in the plurality of energy storage units further comprises:
   controlling, in a case that the remaining capacity of the first energy storage unit is less than a maximum preset capacity, the energy generation system to charge the first energy storage unit.

3. The control method according to claim 1, wherein the controlling the energy generation system to charge the first energy storage unit in the plurality of energy storage units comprises:
   controlling, in a case that the output power of the energy generation system is less than the charge power of the first energy storage unit, the energy generation system to charge the first energy storage unit, and controlling at least one of the second energy storage unit or the power grid to charge the first energy storage unit, wherein the remaining capacity of the second energy storage unit is greater than or equal to a minimum preset capacity.

4. The control method according to claim 1, wherein the controlling the energy generation system to charge the first energy storage unit in the plurality of energy storage units further comprises:
controlling, in a case that the output power of the energy generation system is greater than or equal to the charge power of the first energy storage unit, the output power of the energy generation system to be identical to the charge power of the first energy storage unit; and
controlling, after controlling the output power of the energy generation system to be identical to the charge power of the first energy storage unit, the energy generation system to charge the first energy storage unit.

5. The control method according to claim 1, wherein the controlling the energy generation system and/or the power grid to charge the second energy storage unit further comprises:
controlling, in a case that the output power of the energy generation system is less than the charge power of the first energy storage unit, the energy generation system and the power grid to charge the first energy storage unit, and controlling the power grid to charge the second energy storage unit.

6. The control method according to claim 1, wherein the controlling, in the case that the output power of the energy generation system is greater than the charge power of the first energy storage unit, the energy generation system to charge the first energy storage unit, and controlling the energy generation system and/or the power grid to charge the second energy storage unit further comprise:
controlling, in a case that a difference between the output power of the energy generation system and the charge power of the first energy storage unit is less than a maximum charge power of the second energy storage unit, the energy generation system and the power grid to charge the second energy storage unit.

7. The control method according to claim 1, wherein the controlling the energy generation system to charge the first energy storage unit in the plurality of energy storage units further comprises:
controlling, in a case that the at least one dispatch status of the power grid comprises a requirement for energy dispatch and the output power of the energy generation system is greater than a required power of the power grid, based on the output power of the energy generation system, the charge power of the first energy storage unit, and the remaining capacity of the second energy storage unit, the energy generation system to charge the first energy storage unit.

8. The control method according to claim 7, wherein the controlling the energy generation system to charge the first energy storage unit in the plurality of energy storage units comprises:
controlling, in a case that the remaining capacity of the second energy storage unit is greater than or equal to a minimum preset capacity, the energy generation system to charge the first energy storage unit, or controlling the energy generation system and the second energy storage unit to charge the first energy storage unit.

9. The control method according to claim 7, wherein the controlling the energy generation system to charge the first energy storage unit in the plurality of energy storage units comprises:
controlling, in a case that the remaining capacity of the second energy storage unit is less than a minimum preset capacity, the energy generation system to charge the second energy storage unit; and
controlling, after controlling the energy generation system to charge the second energy storage unit, the energy generation system and/or the second energy storage unit to charge the first energy storage unit.

10. The control method according to claim 1, wherein the controlling, in the second stage, the first energy storage unit to discharge electricity to the second energy storage unit in the plurality of energy storage units comprises:
controlling, in the second stage, based on at least one of dispatch status of the power grid or a remaining capacity of the second energy storage unit, the first energy storage unit to discharge electricity to the second energy storage unit in the plurality of energy storage units.

11. The control method according to claim 10, wherein the controlling, based on at least one of dispatch status of the power grid or a remaining capacity of the second energy storage unit, the first energy storage unit to discharge electricity to the second energy storage unit in the plurality of energy storage units comprises:
controlling, in a case that the remaining capacity of the second energy storage unit is less than a maximum preset capacity, the first energy storage unit to discharge electricity to the second energy storage unit.

12. The control method according to claim 10, wherein the controlling, based on at least one of dispatch status of the power grid or a remaining capacity of the second energy storage unit, the first energy storage unit to discharge electricity to the second energy storage unit in the plurality of energy storage units comprises:
controlling, in a case that the dispatch status of the power grid comprises a requirement for energy dispatch, an output power of the energy generation system to be 0, and controlling the first energy storage unit to discharge electricity to the second energy storage unit.

13. The control method according to claim 10, wherein the controlling, based on the at least one of dispatch status of the power grid or the remaining capacity of the second energy storage unit, the first energy storage unit to discharge electricity to the second energy storage unit in the plurality of energy storage units comprises:
controlling, in a case that the dispatch status of the power grid comprises a requirement for energy dispatch, an output power of the energy generation system to be equal to a required power of the power grid, and controlling the first energy storage unit to discharge electricity to the second energy storage unit.

14. The control method according to claim 1, wherein the method further comprises at least one of:
controlling, in a case that a state of charge of the first energy storage unit reaches a first preset capacity, the first energy storage unit to switch from the first stage to the second stage;
controlling, in a case that a state of discharge of the first energy storage unit reaches a second preset capacity, the first energy storage unit to switch from the second stage to the first stage; or controlling, in a case that a remaining capacity of the first energy storage unit reaches a maximum preset capacity, the energy generation system to stop charging the first energy storage unit.

15. A control apparatus comprising:
a control unit in control of an energy storage system coupled to the control apparatus, wherein the energy storage system is coupled with an energy generation system and a power grid; the energy storage system is configured to store electrical energy obtained from the energy generation system and release the electrical energy to the power grid; the energy storage system comprises a plurality of energy storage units, wherein the control unit is configured to:
control, in a first stage, the energy generation system to charge a first energy storage unit in the plurality of energy storage units, wherein the first stage is a charging stage in a charging cycle of the first energy storage unit; and
control, in a second stage, the first energy storage unit to discharge electricity to a second energy storage unit in the plurality of energy storage units, wherein the second stage is a discharging stage in the charging cycle of the first energy storage unit,
wherein the control unit is further configured to:
control, in a case that at least one dispatch status of the power grid comprises no requirement for energy dispatch, based on an output power of the energy generation system, a charge power of the first energy storage unit, and a remaining capacity of the second energy storage unit, the energy generation system to charge the first energy storage unit;
control, in a case that the remaining capacity of the second energy storage unit is less than a minimum preset capacity, the energy generation system and/or the power grid to charge the second energy storage unit,
control, in a case that the output power of the energy generation system is equal to the charge power of the first energy storage unit, the energy generation system to charge the first energy storage unit, and control the power grid to charge the second energy storage unit; and
control, in a case that the output power of the energy generation system is greater than the charge power of the first energy storage unit, the energy generation system to charge the first energy storage unit, and control the energy generation system and/or the power grid to charge the second energy storage unit.

16. An energy storage system control apparatus comprising:
a memory configured to store an instruction; and
a processor coupled with the memory, the processor configured to read the instruction and perform:
controlling, in a first stage, an energy generation system to charge a first energy storage unit in a plurality of energy storage units of the energy generation system, wherein the first stage is a charging stage in a charging cycle of the first energy storage unit and wherein the energy storage system is coupled with the energy generation system and a power grid, and is configured to store electrical energy from the energy generation system and release the electrical energy to the power grid; and
controlling, in a second stage, the first energy storage unit to discharge electricity to a second energy storage unit in the plurality of energy storage units, wherein the second stage is a discharging stage in the charging cycle of the first energy storage unit,
wherein the controlling, in the first stage, the energy generation system to charge the first energy storage unit in the plurality of energy storage units comprises:
controlling, in a case that at least one dispatch status of the power grid comprises no requirement for energy dispatch, based on an output power of the energy generation system, a charge power of the first energy storage unit, and a remaining capacity of the second energy storage unit, the energy generation system to charge the first energy storage unit;
controlling, in a case that the remaining capacity of the second energy storage unit is less than a minimum preset capacity, the energy generation system and/or the power grid to charge the second energy storage unit,
wherein the controlling the energy generation system and/or the power grid to charge the second energy storage unit further comprises:
controlling, in a case that the output power of the energy generation system is equal to the charge power of the first energy storage unit, the energy generation system to charge the first energy storage unit, and controlling the power grid to charge the second energy storage unit; and
controlling, in a case that the output power of the energy generation system is greater than the charge power of the first energy storage unit, the energy generation system to charge the first energy storage unit, and controlling the energy generation system and/or the power grid to charge the second energy storage unit.

* * * * *